Patented Nov. 11, 1941

2,262,398

UNITED STATES PATENT OFFICE 2,262,398

METHOD OF PREPARING AN ORGANIC VULCANIZING AGENT

Paul C. Jones, Akron, Ohio, assignor to The B. F. Goodrich Company, New York, N. Y., a corporation of New York No Drawing. Application May 10, 1940, Serial No. 334,388

4 Claims. (Cl. 260—128)

This invention relates to a method of preparing an organic material which is useful as a vulcanizing agent for rubber, and has as its principal object to prepare vulcanizing agents having large amounts of combined sulfur capable of being liberated under vulcanizing conditions.

The method of this invention comprises splitting a sulfur-sulfur bond of a dithiazyl polysulfide with a reagent prepared by dissolving sulfur in a primary alkyl amine, and eliminating the thiazyl ammonium sulfide from the reaction product.

As a specific example of the method of this invention 6.4 gms. (.2 mol.) of sulfur was dissolved in 19.8 gms. (.2 mol.) of cyclohexyl amine. The temperature rose spontaneously to about 40° C., and a dark red liquid resulted. 35.2 gms. (.1 mol.) of di-4,5-dimethylthiazyl tetrasulfide were added to this liquid with stirring. The temperature rapidly rose to 70° C., crystallization suddenly occurred, and the mixture set to a paste. When the reaction was complete, ether was added, and the ether-insoluble crystals were separated from the ether-soluble oil. The crystals were found to be 4,5-dimethylthiazyl cyclohexylammonium sulfide. The oil, of undetermined structure, was found to be an extremely active accelerating and vulcanizing agent for rubber, its behavior indicating that it contained combined sulfur which was released during vulcanization. Since no free sulfur was observed in the reaction product, it seems likely that the oily product contained the sulfur which had originally been dissolved in the amine loosely connecting the 4,5-dimethylthiazyl group and the cyclohexylamino group of half of each of these two reagents.

Any alkyl or arylene thiazyl polysulfide such as di-toluothiazyl disulfide, dibenzothiazyl disulfide, di-4-ethylthiazyl tetrasulfide, di-4,5-dimethylthiazyl disulfide, etc., may be split by the method of this invention.

Sulfur may be dissolved in any functionally aliphatic primary amine such as ethyl amine, butyl amine, benzyl amine, ethylene diamine, triethylene tetramine, or other primary open chain alkyl, aralkyl, or cycloalkyl amines.

The thiazyl polysulfide and the primary alkyl amine will in general react in a molar ratio of 1:2. The amount of sulfur dissolved in the amine is dependent upon the character of product desired. Thus, if very powerful vulcanizing agents are employed, sulfur may be dissolved in the amine in molar ratios of 2:1 or 3:1, although the use of equimolar or semimolar ratios of sulfur to amine ordinarily produces vulcanizing agents of satisfactory activity.

Although I have herein disclosed a specific embodiment of my invention, I do not intend to limit the invention solely thereto, for it will be obvious to those skilled in the art that many variations and modifications are within the spirit and scope of the invention as defined in the appended claims.

I claim:

1. The method of preparing an organic vulcanizing agent which comprises splitting a sulfur-sulfur bond in a thiazyl polysulfide with a solution of sulfur in a functionally aliphatic primary amine, and eliminating from the reaction mixture the thiazyl ammonium sulfide which is formed.

2. The method of preparing an organic vulcanizing agent which comprises splitting a sulfur-sulfur bond in a thiazyl polysulfide with a solution of sulfur in cyclohexyl amine, and eliminating from the reaction mixture the thiazyl cyclohexylammonium sulfide which is formed.

3. The method of preparing an organic vulcanizing agent which comprises splitting a sulfur-sulfur bond in di-4,5-dimethylthiazyl tetrasulfide with a solution of sulfur in a functionally aliphatic primary amine and eliminating from the reaction mixture the 4,5-dimethylthiazyl ammonium sulfide which is formed.

4. The method of preparing an organic vulcanizing agent which comprises splitting a sulfur-sulfur bond in di-4,5-dimethylthiazyl tetrasulfide with a solution of sulfur in an equimolar amount of cyclohexyl amine, and eliminating from the reaction mixture the 4,5-dimethylthiazyl cyclohexylammonium sulfide which is formed.

PAUL C. JONES.